Sept. 14, 1954 H. F. HEISLER 2,689,031
CLUTCH SHIFTING LINKAGE
Filed March 21, 1950 5 Sheets-Sheet 3
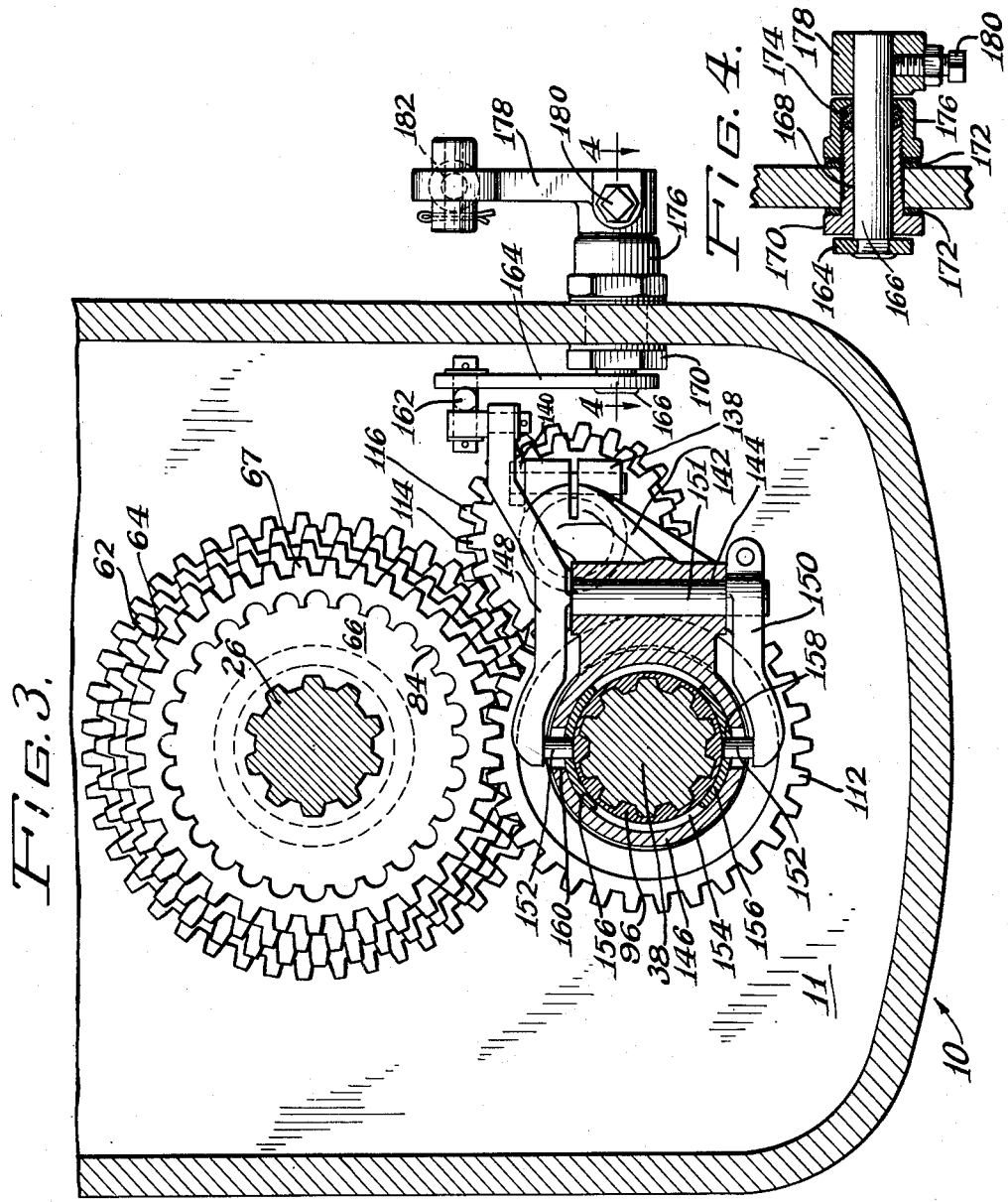
Inventor:
Harry F. Heisler
By Bair, Freeman & Molinare
Attys.

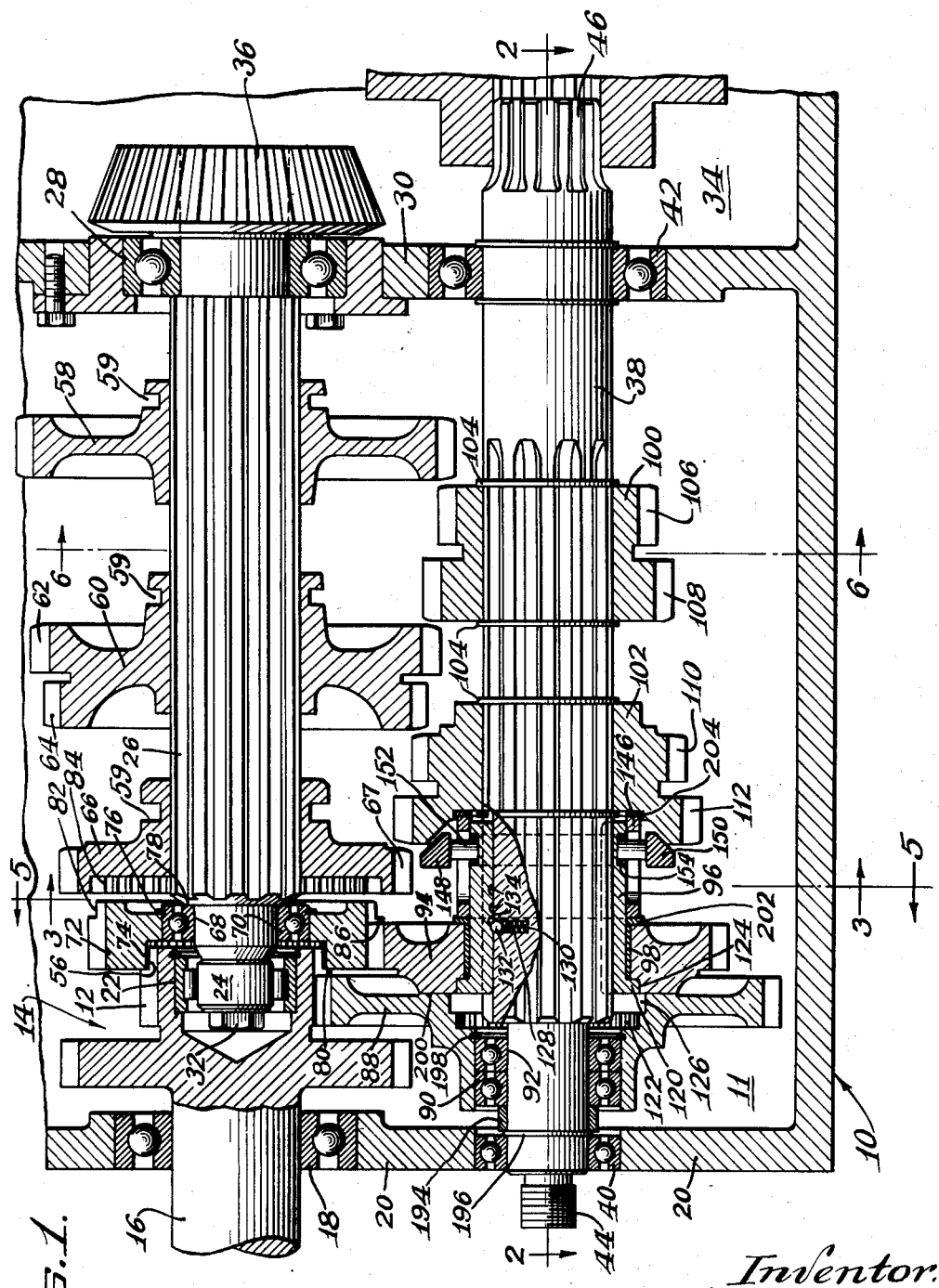

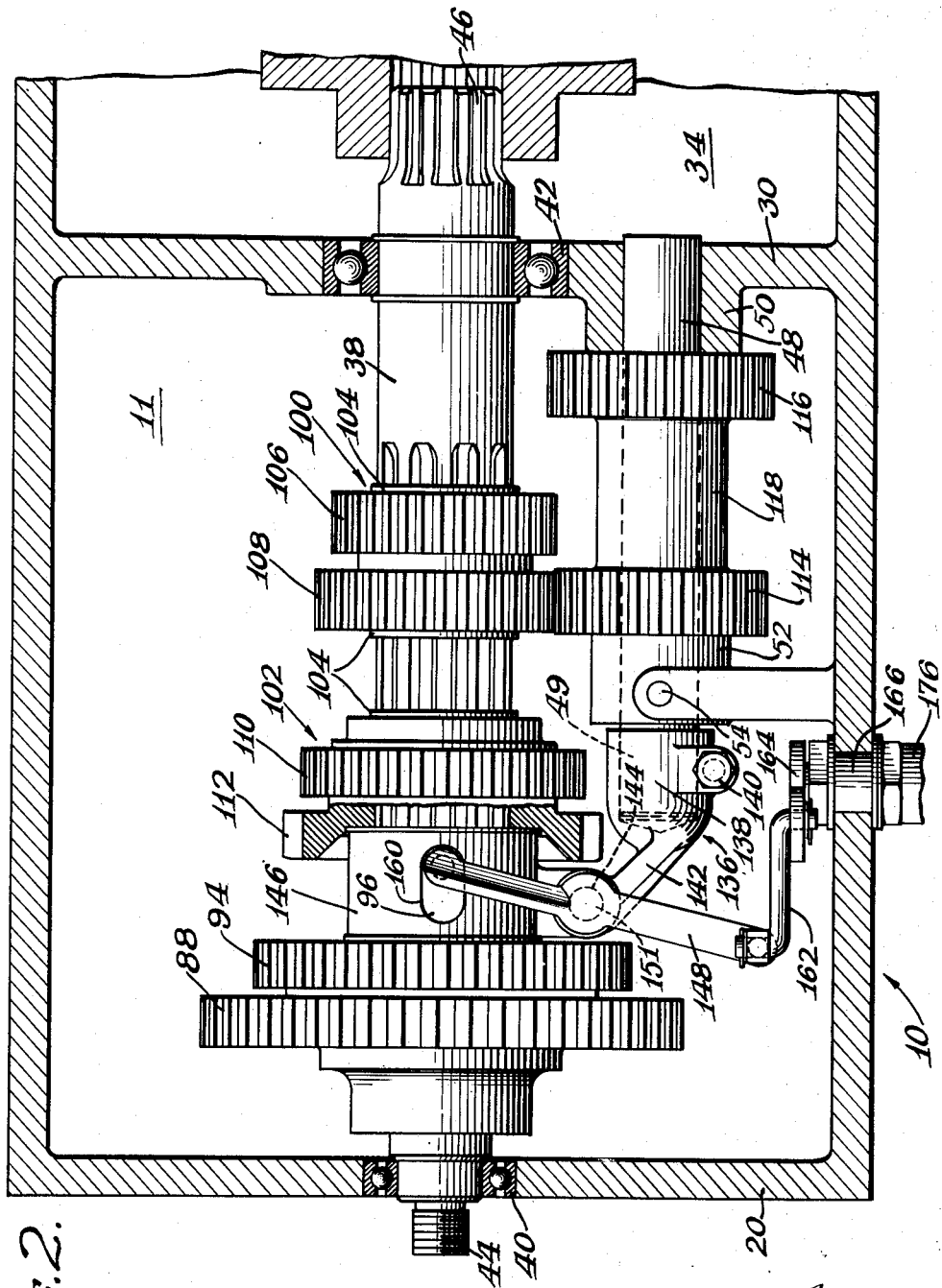

Sept. 14, 1954     H. F. HEISLER     2,689,031
CLUTCH SHIFTING LINKAGE

Filed March 21, 1950     5 Sheets-Sheet 4

Inventor:
Harry F. Heisler
By Bair, Freeman & Molinare
Attys.

Sept. 14, 1954     H. F. HEISLER     2,689,031
CLUTCH SHIFTING LINKAGE
Filed March 21, 1950     5 Sheets-Sheet 5
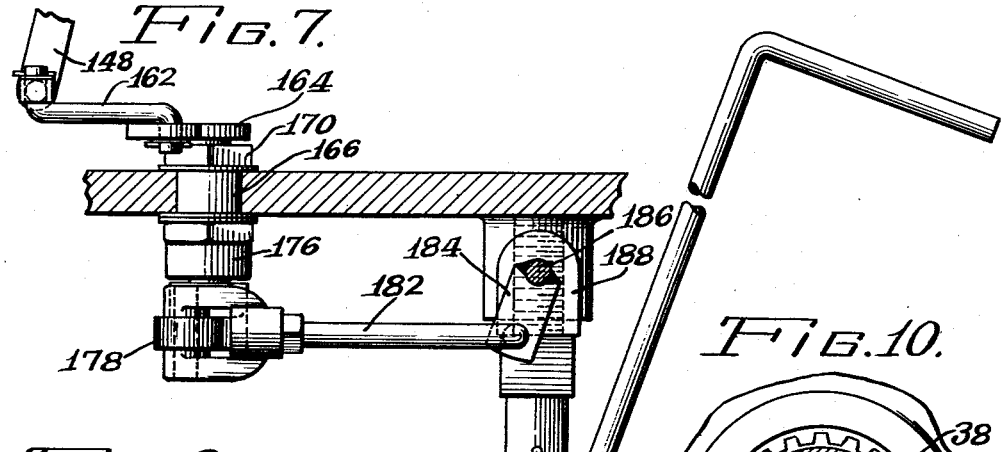
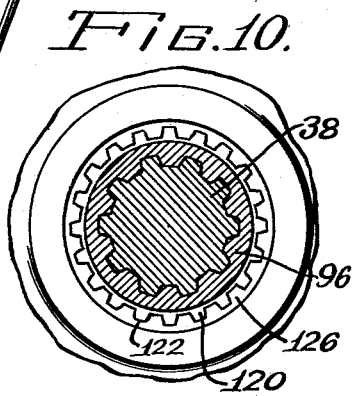
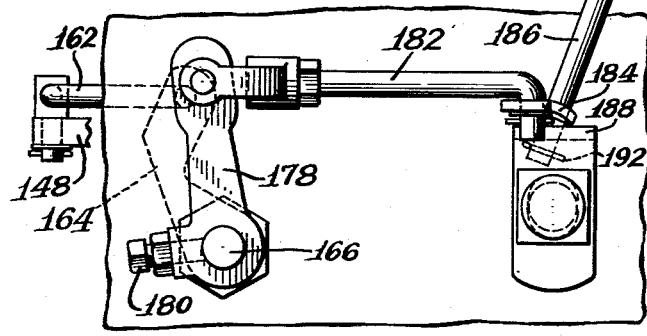
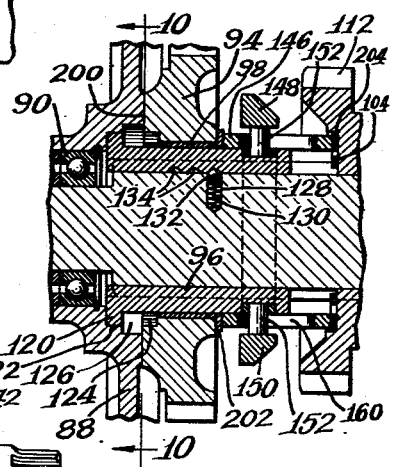
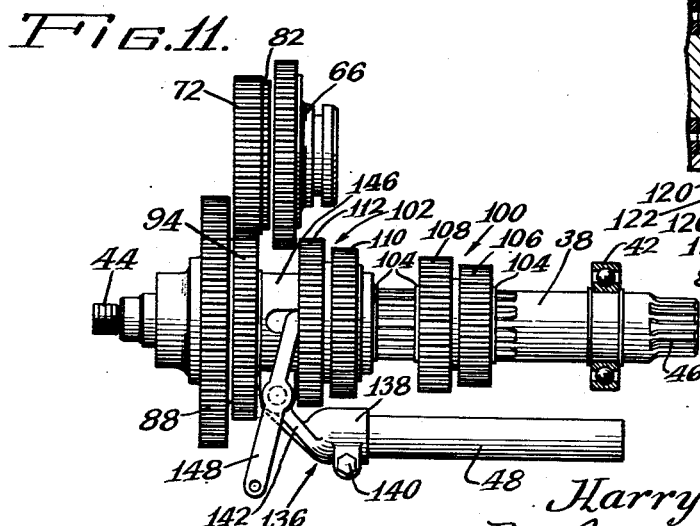
Inventor:
Harry F. Heisler
By Bair, Freeman & Molinare
Attys.

Patented Sept. 14, 1954

2,689,031

UNITED STATES PATENT OFFICE 2,689,031

CLUTCH SHIFTING LINKAGE

Harry F. Heisler, Hudson, Iowa

Application March 21, 1950, Serial No. 150,852

4 Claims. (Cl. 192—99)

This invention relates to an overdrive system and more particularly to an overdrive system which is easily adapted to existing transmissions of tractors and the like. The range of power speeds of farm tractors is very limited and the top speed of the usual power speed range is relatively low. For example, a typical tractor may have four power speeds ranging from 2½ miles per hour to about 5½ miles per hour. Tractors are also often equipped with a fifth speed of about 18 M. P. H. which is attainable only when there is very little or no load on the tractor, and which speed is attained by connecting the drive shaft directly to the supply of power, thereby bypassing the countershaft. The tractor's power speeds are designed low because the loads carried or hauled by tractors are usually very large and greater pulling power or torque is developed at lower speeds.

However, there are many occasions when the tractor is moving between jobs when it is unloaded or partially unloaded and higher power speeds are desirable. When those occasions arise, the tractor is unable to meet the demand for higher speeds, because of the low gear ratios which are available in the transmission. The high direct drive speed is often impractical if the tractor is partially loaded, or if the terrain over which the tractor is moving is rough. Thus it is desirable to provide intermediate power speeds having values between the highest of the existing power speeds and the high direct drive speed. While it is true that the entire transmission could be changed to give these higher power speeds, the high torque, lower power speeds would be lost in such an arrangement, which would be undesirable.

In adapting an overdrive system to an existing transmission it is desirable to retain as much as possible of the existing transmission. If possible, it is desirable to integrate the overdrive system with the existing shifting arrangement for the transmission. The adaptation of an overdrive to an existing transmission without losing the original speeds of the transmission requires the use of additional shiftable members and means whereby the shiftable members are actuated. The proper use of such additional shiftable members is predicated, in some degree, upon a means for positioning and retaining the shiftable members in predetermined positions.

Thus, one of the objects of this invention is to provide a novel overdrive system for tractors which provides a range of higher speeds without sacrificing the existing range of high torque lower speeds.

Another object of this invention is to provide an overdrive system for use within the transmission housing of the vehicle, which may be easily adapted to the existing transmission system.

A further object of this invention is to provide an overdrive system which is designed to be easily fitted into the existing transmission housing for a motor vehicle.

A still further object of this invention is to provide a novel overdrive system, which converts an existing four speed transmission into an eight speed transmission, or an existing five speed transmission into a nine speed transmission.

Another object of this invention is to provide a novel ball poppet means for positioning coaxial members, which are shiftable axially therebetween, with respect to each other in a plurality of predetermined positions.

Still another object of this invention is to provide a novel shifting means which consists of simple and inexpensive linkages for use with the novel overdrive system, which shifting means is easily adapted to the existing transmission structure.

And still a further object of this invention is to provide a novel support means within the transmission housing for performing the dual function of supplying a journal for a rock shaft of the shifting means and for supporting a guide collar for the shifting fingers.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a cross section side view of the drive shaft and the countershaft of a typical transmission for a tractor, which have been modified to include elements of my invention, and shows the shiftable clutch collar, mounted on the countershaft, shifted into the overdrive speed position.

Figure 2 is a top plan view, partly in cross section, of the countershaft and reverse gear shaft of a typical transmission for a tractor, which have been modified to include elements of my invention, which view is taken on line 2—2 of Figure 1.

Figure 3 is an end view partly in cross section of the transmission housing and the modified shafts and gears mounted therein and is taken on line 3—3 of Figure 1.

Figure 4 is a cross section view of one of the rock shafts in the overdrive shifting linkage and is taken on line 4—4 of Figure 3.

Figure 7 is a top plan view, partly in cross section and partly in elevation with portions of the transmission housing broken away, of a portion of the overdrive shifting linkage and is taken on line 7—7 of Figure 3.

Figure 8 is a side view of the part of the overdrive shifting linkage shown in Figure 7, and also shows the actuating rod for the shifting linkage.

Figure 9 is a cross sectional view of the shiftable clutch collar mounted on the countershaft, showing the clutch collar shifted into the regular speed position.

Figure 10 is a cross sectional view of the clutch collar and countershaft and is taken on line 10—10 of Figure 9.

Figure 6:
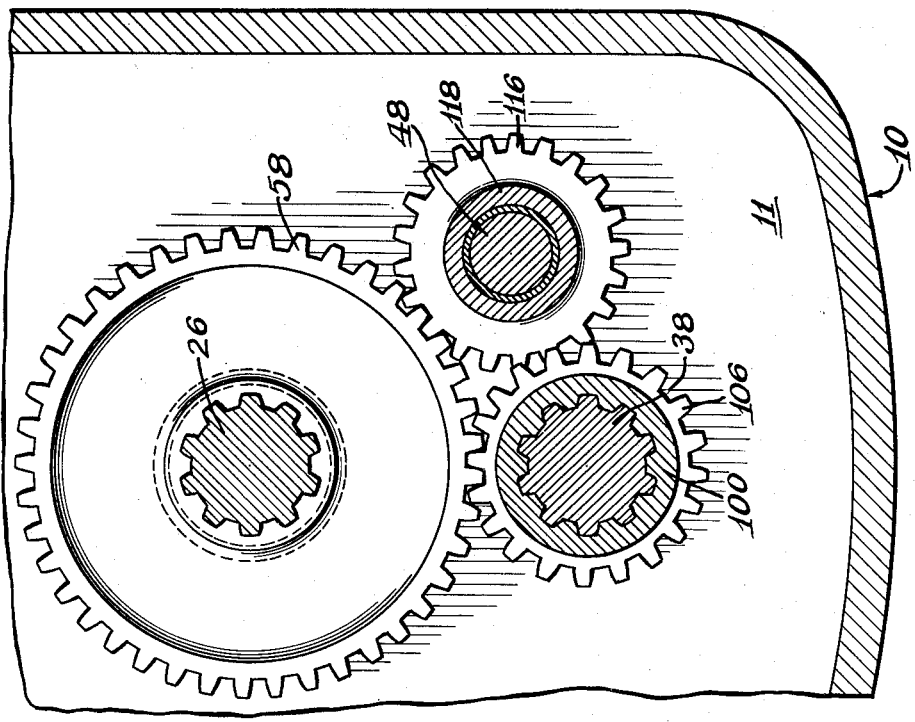
Figure 6 is another cross sectional end view of the shafts and gears within the transmission housing, and is taken on line 6—6 of Figure 1.

Figure 11 shows substantially the major parts other than the shifting linkage that are supplied for adapting the overdrive system to the existing transmission. The view is similar to that in Figure 2, with the addition of the two gears that are supplied for the drive shaft. These latter two gears are shown in Figure 11 rotated out of vertical position, but positioned axially substantially as they would be in the transmission housing. The parts in Figure 11 outlined in dot-dash line are parts that are similar to previous existing parts in the transmission but which are, nevertheless, replaced.

For the purposes of this description of my invention, I have selected to describe the modifications on a typical five speed tractor. The standard arrangement of elements in the tractor's transmission housing includes a drive shaft, a countershaft and a reverse gear shaft. The countershaft is journalled in bearings in a pair of opposite walls of the transmission housing. The reverse gear shaft is shorter than the drive shaft or countershaft and is supported at one point in one wall of the transmission housing and supported at another point by a standard located in the transmission shifting chamber, substantially in mid-length thereof.

The drive shaft is journalled at one point in a bearing mounted in a wall of the transmission housing and extends into the transmission shifting chamber. The other support for the drive shaft is a bearing for the extended end of the drive shaft, which bearing is journalled within a concentric recess of the power drive gear. The power drive gear itself has an extension shaft formed integrally therewith and journalled in bearings in another wall of the transmission housing. Effectively, the drive shaft is supported by bearings in opposite walls of the transmission housing through the bearing joint in the recess of the power drive gear.

This power drive gear which is coupled to the source of power is in mesh with a single counter gear splined to the countershaft, whereby the countershaft is rotated when the power drive gear rotates. The bearing which is at the end of the drive shaft, and is journalled in the power drive gear recess, permits overriding of the power drive gear on the drive shaft.

Also non-shiftably splined to the countershaft are a pair of spaced double gears, each gear being of a different diameter and adapted to mesh with other gears on the drive shaft, whereby said drive shaft is rotated at different speeds. One each of the two pairs of double gears correspond to speeds referred to as first, second, third, and fourth. The gear that corresponds to second speed is in mesh with a first gear rotatably mounted on the reverse gear shaft.

The reverse gear shaft is fixedly mounted within the transmission housing. The first gear on the reverse gear shaft is connected by means of a collar, rotatably mounted on the reverse gear shaft, to a second gear. The first and second gears and the collar rotate as a unit.

On the drive shaft are two single and one double shiftable gears. These gears are splined to the drive shaft, whereby the rotation of any one of the gears will result in the rotation of the drive shaft. All the gears are adapted to be shifted in opposite directions along the drive shaft. The first single gear is adapted to engage the gear on the countershaft corresponding to first when shifted in one direction and to engage the second gear on the reverse gear shaft when shifted in the opposite direction. The engagement with the second gear on the reverse shaft results in rotation of the drive shaft in the reverse direction.

The double gear on the drive shaft is positioned between the spaced pair of double gears on the countershaft. When the double gear is shifted in one direction, one of its gears engages the gear on the countershaft corresponding to second, and when shifted in the opposite direction, the other gear of the double gear meshes with the countershaft gear corresponding to third. Similarly, the second single gear on the drive shaft when shifted in one direction engages the countershaft gear corresponding to fourth.

This second single gear on the drive shaft is also provided with an internally splined recess whereby when it is shifted, in the opposite direction to that wherein the fourth speed gear was engaged, the internal splines engage the teeth of the power drive gear rotatably journalled at the end of the drive shaft, whereby a fifth speed is provided. The internal splines on the second single drive shaft gear engage only a portion of the power drive gear edge. This is provided for by reducing the diameter of the power drive gear over the portion to be engaged. Then the portion of the power drive gear that is not reduced in diameter engages the second single drive shaft gear at a bearing interface and limits the extent of shift of the second single gear. This is desirable to prevent the second single drive-shaft gear from being shifted to an interfering position with the single counter gear on the countershaft.

As is well known in the art, when any shiftable gear is in mesh, all the other shiftable gears are disengaged.

Referring now to the modified form which incorporates the elements of my invention and as shown in the figures, there is shown in Figure 1, a transmission housing, generally indicated at 10 enclosing a transmission shifting chamber 11. A power drive gear 12 is part of a double gear 14 integrally formed with extension shaft 16. The extension shaft 16 is journalled by bearing 18 in wall 20 of transmission housing 10. The power drive gear 12 has a recess 22 therein adapted to receive sealed bearing 24.

A drive shaft generally indicated at 26 is journalled at a region intermediate its ends by means of bearing 28 in wall 30 of transmission housing 10. Other support for drive shaft 26 is located at the extended end thereof and comprises bearing 24 which is secured to drive shaft 26 by means of bolt 32. Thus, the drive shaft 26 is effectively supported by bearings 18 and 28 in walls 20 and 30 of transmission housing 10 through the bearing joint comprising bearing 24 in recess 22 of power drive gear 12.

The drive shaft 26 extends through wall 30 of the transmission housing into chamber 34 within the transmission housing. Mounted on the end of the shaft 26 which extends into chamber 34 is a pinion gear 36 which is the power take-off for the wheels of the tractor.

A countershaft 38 is shown rotatably mounted in bearings 40 and 42 which are respectively positioned in walls 28 and 30 of transmission housing 10. One end of countershaft 38 is provided with an attachment 44 which may be connected to a hydraulic system pump (not shown) so as to actuate the hydraulic system of the tractor. The other end of countershaft 38 is splined as at 46 so as to provide means for driving the auxiliary take-off which powers the attachments to the tractors.

As seen more clearly in Figures 2 and 3, a new reverse gear shaft 48 is fixedly mounted in supports 50 and 52 within the transmission housing. Support 50 is integral with wall 30 of transmission housing and support 52 projects into the transmission housing chamber about mid-way between walls 28 and 30 of the transmission housing. A pin 54 extends through support 52 and through reverse gear shaft 48 thereby fixing shaft 48 in position in supports 50 and 52. The new reverse gear shaft 48 extends beyond support 52 as at 49 to provide a support for a bracket as will be hereinafter described.

Referring back to the drive shaft and to the power drive gear, as shown in Figure 1, the power drive gear 12 is reduced in diameter over a portion of the gear edge thereof as indicated at 56. The drive shaft 26 is provided with two single and one double shiftable gears. These gears are splined to the drive shaft 26 and are rotatable therewith and are adapted to be shifted in either direction along the drive shaft 26. The first shiftable single gear 58 is adapted to engage the gear on the countershaft corresponding to first speed when shifted in one direction and to engage the reverse speed gear when shifted in the opposite direction. The double shiftable gear 60 has two gear faces 62 and 64 thereon. Gear 62 is adapted to engage the second speed gear on the countershaft when the double gear 60 is shifted in one direction, and gear 64 is adapted to engage the third speed gear mounted on the countershaft when the double gear 60 is shifted in the opposite direction. The second single shiftable gear 66 is adapted to engage the fourth speed gear when it is shifted in one direction. Each of the shiftable gears 58, 60, and 66 are provided with grooves 59 therein adapted to receive means (not shown) for shifting said gears. The means for shifting these gears, provided in the original transmission, are retained herein and are well known in the art.

The single gear 66 in the original five speed setup was provided with internal splines to engage the reduced portion 56 of the gear edge of power drive gear 12. In the modified form herein, a portion of the spline length of shaft 26 has been reduced in diameter to eliminate the splines and to provide a bearing surface as at 68. Mounted on the reduced diameter portion 68 of shaft 26 is a ball bearing 70. A second power drive gear 72 is mounted on the bearing 70 and, therefore, is rotatably mounted on shaft 26. This second power drive gear 72 is provided with an internally splined recess 74 adapted to engage the reduced diameter portion 56 of the gear edge of power drive gear 12. A snap ring 76 acts to keep the two power drive gears constantly in mesh, so that they rotate as a unit. The shoulder 78 in shaft 26 acts to keep the bearing 70 axially restrained from movement along the shaft. The greater diameter portion of the gear edge of power drive gear 12 butts against the face of the second power drive gear 72 at the interface 80, thereby restraining the gear 72 from axial movement in the opposite direction.

The second power drive gear 72 has a reduced diameter portion 82 on its gear edge as shown in Figure 1. The shiftable single gear 66 is provided with a splined internal recess 84 which is adapted to engage the second power drive gear 72 over the reduced diameter portion 82 of its gear edge, when the shiftable single gear 66 is shifted to the left as seen in Figure 1. The larger diameter portion of the gear edge of power drive gear 72 provides a bearing interface 86 against which the shiftable single gear 66 butts when it is shifted to the left as described above. This bearing interface 86 provides a stop for limiting the motion of gear 66 in the direction to the left as shown in Figure 1.

Referring next to the countershaft 38, a first and second driven gear is shown in mesh with the first and second power drive gears. A first driven gear 88 is shown in mesh with power drive gear 12. This first driven gear 88 is rotatably supported on bearings 90 which are mounted on a reduced diameter section 92 of countershaft 38. A second driven gear 94 is rotatably mounted with respect to countershaft 38 and is in mesh with the second power drive gear 72.

Splined to the countershaft 38 is a clutch collar 96 which is rotatable with countershaft 38 and is shiftable in an axial direction thereon. A bearing 98 mounted on the outer periphery of clutch collar 96 is adapted to receive and support the rotatably mounted gear 94. Also splined to countershaft 38 are a pair of double gears 100 and 102. Snap rings 104 are adapted to engage the faces of double gears 100 and 102 to prevent their axial movement along the countershaft 38. Gear 106 of double gear 100 corresponds to a first speed and is adapted to be engaged by first shiftable single gear 58 mounted on drive shaft 26. Gear 108 of double gear 100 corresponds to the second speed gear and is adapted to receive gear 62 of shiftable double gear 60 mounted on drive shaft 26. Gear 110 of double gear 102 corresponds to third speed and is adapted to receive gear 64 of shiftable double gear 60 which is mounted on drive shaft 26. Gear 112 of double gear 102 corresponds to fourth speed and is adapted to receive gear face 67 of the second shiftable single gear 66 mounted on drive shaft 26.

As seen more clearly in Figures 2 and 3, a pair of gears 114 and 116 joined together by a collar 118 are rotatably mounted on reverse gear shaft 48. Gear 114 is in mesh with the second speed gear on countershaft 38 which is gear 108 of double gear 100. The gear 116 is adapted to be engaged by the shiftable single gear 58 which is mounted on drive shaft 26.

Thus far the gears and their relationship to each other have been described. The manner of driving the countershaft through the power drive gears will now be disclosed. As set forth above, a clutch collar 96 is splined to shaft 38 and is shiftable in an axial direction thereon. One end of clutch collar 96 has formed thereon a gear 120. The first driven gear 88 has formed therein an internally splined recess 122 which is adapted to receive and engage the teeth of gear 120 when the clutch collar 96 is shifted to the left when viewed as in Figure 1, and which position is shown in Figure 9. The second driven gear 94 has an internally splined recess 124 which is adapted to receive and engage the teeth of gear 120 when the clutch collar 96 is shifted to the right which is the position shown in Figure 1. The first driven gear 88 is also provided with an enlarged recess 126 which is of greater diameter than the gear 120 and which is positioned between the splined recesses 122 and 124. When gear 120 is positioned in recess 126, both the first driven gear 88 and the second drive gear 94 are disengaged from clutch collar 96.

Figure 5:
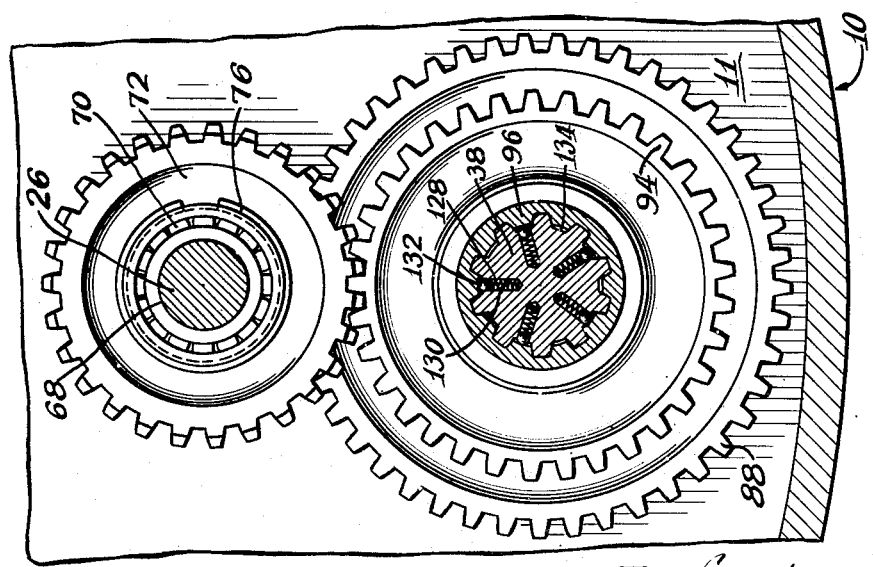
Figure 5 is an end view, partly in cross section, of the modified drive shaft and countershaft, showing the ball poppet means in more detail, and is taken on line 5—5 of Figure 1.

A ball poppet means for axially positioning the clutch collar 96 with respect to the drive shaft 38 is also provided and is best shown in Figures 1 and 5. Referring to Figure 5, a plurality of radially extending cylindrical bores 128 are provided in countershaft 38. These bores 128 are located in alternate crotches between the splines. The ball poppet means further comprises a compression spring 130 positioned in each bore 128, and a steel ball 132 mounted in each bore 128 adjacent the mouth thereof. These balls 132 are in engagement with the spring 130 in the bore 128, and are resiliently biased outwardly from bore 128.

The clutch collar 96 is provided with a plurality of arcuate grooves 134 located in the faces of the splines of the clutch collar 96. These arcuate grooves lie in planes perpendicular to the longitudinal axis of the clutch collar 96 and the countershaft 38, and are adapted to receive the resiliently biased balls 132, whereby resistance to axial displacement by the clutch collar 96 and the countershaft 38 is obtained. As shown in Figure 1, these arcuate grooves 134 are provided in three planes to provide for the three positions of the clutch collar; the first position, as shown in Figure 1, being with the gear 120 in mesh with splined recess 124, the second position being with gear 120 positioned in recess 126, and the third position being with gear 120 in mesh with splined recess 122.

The mechanism for shifting the clutch collar 96 includes a bracket generally indicated at 136, best shown in Figures 2, 3 and 11. The bracket 136 has a cap portion 138 which is split so that the cap 138 may be adjustably clamped on the extended end 49 of reverse gear shaft 48, by means of bolt 140. The bracket 136 has extending from the cap portion 138 an arm 142 which has drilled therein a vertical bore 144 adapted to receive a rotatable member. Also extending from arm 142 is a collar 146 which is coaxially positioned around the clutch collar 96. The collar 146 is spaced from the surface of clutch collar 96, so as to provide clearance between the two coaxial members.

A pair of control arms 148 and 150 are joined together by a shaft 151, which is rockably mounted within vertical bore 144 in arm 142. The arms 148 and 150 extend on opposite sides of the clutch collar 96 and collar 146. A finger 152 is mounted at the extended end of each arm 148 and 150. The fingers 152 are oppositely facing and are positioned in a vertical plane which passes through the axis of countershaft 38, clutch collar 96, and collar 146. The clutch collar 96 is provided with a circumferential channel or groove 154 which is adapted to receive the pins 152. Arcuate bearing strips 156 are positioned in the circumferential groove 154 and receive the extended tips of fingers 152 in holes 158 therein, provided for that purpose. The collar 146 is provided with elongated slots 160 through which the fingers 152 pass to enter into the circumferential groove 154 in clutch collar 96. When the shaft 151 together with arms 148 and 150 are pivoted, the fingers 152 are swung in substantially an axial direction relative to the countershaft 38. This axial motion of fingers 152 is transmitted through bearing 156, through the walls of groove 154, to clutch collar 96, thereby effectuating a shifting of the clutch collar 96.

In order to pivot the arms 148 and 150 together with shaft 151 within bore 144, it is necessary to provide a control linkage, which is most clearly shown in Figures 2, 3, 7 and 8. The arm 148 is connected by a link 162 to a toggle member 164 mounted within the transmission shifting chamber 11 enclosed within transmission housing 10. The toggle member 164 is affixed to a rock shaft 166, which is mounted in the wall of overdrive housing 10, as shown in Figures 2, 3 and 4. As shown clearly in Figure 4, rock shaft 166 passes through an axial bore 168 of an insert 170 positioned in a hole 171 in the wall of transmission housing 10. The hole 171 is formed by reaming out a tapped oil plug hole in housing 10. A pair of grease seals 172 are provided to prevent the leakage of grease or oil between insert 170 and the wall of transmission housing 10. A packing 174 is provided between rock shaft 166 and insert 170 to prevent leakage of oil past the face between those two members. A cap 176 is provided for keeping the packing 174 in position and is threaded to the extended end of insert 170, whereby the entire insert assembly may be clamped together by tightening up on cap 176. A toggle member 178 is secured by means of set screw 180 to the end of rock shaft 166, which extends outside of the transmission housing 10. The toggle member 178 is actuated by a link 182 which in turn is reciprocated by a toggle member 184 welded to a control rod 186. The control rod 186 is supported by a support bracket 188. The control rod 186 passes through a hole 190 in support bracket 188 and is prevented from further passage therethrough in one direction by the toggle member 184 which is welded to the control rod 186. The control rod 186 is prevented from movement through the hole 190 in the opposite direction by means of cotter pin 192.

It can be seen that by rotating the control arm 186, the linkage carries the motion through the rock shaft 166 through the linkages to the control arms 148. The arms 148 and 150 are swung through an arc, by means of rock shaft 151 which is pivoted within bore 144, to effectuate shifting of the clutch collar 96.

A means for axially positioning the driven gears 88 and 94 with respect to the countershaft 38 is also provided as shown in Figure 1. A ring 194 is positioned between bearing 90 and shoulder 196 on countershaft 38. This ring 194 positions the bearing 90 with respect to motion to the left. A snap ring 198 is mounted in an inner recess in first driven gear 88 and engages the bearing 90. The first driven gear 88 and second driven gear 94 have a bearing interface 200 therebetween. In order to restrict the motion of second driven gear 94 in the direction to the right as seen in Figure 1 a pair of spacer rings 202 and 204 are provided on opposite sides of collar 146, with the spacer ring 204 being inserted in a recess in double gear 102, which gear 102 is fixed axially relative to countershaft 38 in the manner described above. It can be seen that the ring 194 and shoulder 196 cooperating with snap ring 198, spacer rings 202 and 204, collar 146 and double gear 102 together clamp the driven gears 88 and 94 in substantially non-movable positions axially, while driven gears 88 and 94 remain rotatably mounted with respect to countershaft 38.

*Operation*

In the operation of the transmission and overdrive, the first and second power drive gears are always in mesh and rotate as a unit. The first driven gear 88 and second driven gear 94 are in mesh respectively with first power drive gear 12 and second power drive gear 72 and hence are always rotated. When the clutch collar 96 is in the position shown in Figure 1, the first driven gear 88 is not rotating as fast as is the second driven gear 94. In the position shown in Figure 1, the second driven gear 94 is splined through clutch collar 96 to countershaft 38, and the countershaft rotates with second driven gear 94. At that time the first driven gear 88 is underrunning the countershaft 38. To provide the various speeds for the tractor or vehicle, the transmission gears 58, 60 and 66 are shifted as before and provide for different speeds.

When the clutch collar 96 is in the position shown in Figure 9, then the first driven gear 88 is splined in driving connection to the countershaft 38 and the second driven gear 94 is overrunning with respect to the countershaft 38. The bearing surface 98 between the clutch collar 96 and the second driven gear 94 provides for ease of rotation. When in this position with the first driven gear in driving connection with the countershaft 38, there are still four more speeds available by shifting the gears 58, 60 and 66, into engagement with the gears mounted on and rotating with countershaft 38.

When the clutch collar is positioned so that gear 120 is within the recess 126, then neither the first driven gear nor second driven gear are in driving engagement with the countershaft 38 and hence countershaft 38 does not rotate. At that point, only one speed is available for the wheels of the tractor and that is obtained by shifting gear 66 in the direction where the internal splines 84 in gear 66 may engage the recessed gear edge 82 of second power drive gear 72. In fact, even if the clutch collar 96 is in engagement with either of the two driven gears 88 or 94, this speed resulting from the engagement of recessed gear edge 82 with internal splines 84 of gear 66 is always available.

Thus, it can be seen that I have provided a novel overdrive system for a motor vehicle, which overdrive system may be easily fitted into the existing transmission housing and adapted to the existing transmission system therein, and which overdrive system preserves all the original speeds of the transmission besides providing a range of higher speeds, whereby for example an existing five speed transmission is converted into a nine speed transmission.

There have also been provided a simple and inexpensive shifting means, a novel support bracket for the shifting means adapted to be mounted within the transmission housing, and ball poppet means for positioning shiftable coaxial overdrive members with respect to each other in a plurality of predetermined positions.

While there has been shown and described a particular embodiment of this invention, it will be obvious to those skilled in the art that various changes and modification may be made therein without departing from the invention and, therefore, it is intended in the appended claims to cover all such changes and modifications as fall within the true spirit and scope of the invention.

What I claim as new and desire to secure by Letters Patent of the United States is:

1. A shifting means for an overdrive clutch collar, which clutch collar is slidably mounted on a shaft and rotatable therewith, said clutch collar having a circumferential groove therein; said shifting means comprising a plurality of pins positioned within the circumferential groove and adapted to be moved axially of said shaft, whereby the clutch collar is shifted, said plurality of pins being symmetrically disposed about the center of rotation of said clutch collar, a plurality of arms secured to a rock shaft and having said plurality of pins extending therefrom, limiting means positioned to engage said pins to restrict the range of movement of said pins, and a mounting bracket for said limiting means having journal means therein for said rock shaft.

2. A shifting means for an overdrive clutch collar, which clutch collar is slidably mounted on a shaft and rotatable therewith, said clutch collar having a circumferential groove therein; said shifting means comprising a plurality of pins positioned within the circumferential groove and adapted to be moved axially of said shaft, whereby the clutch collar is shifted, said plurality of pins being symmetrically disposed about the center of rotation of said clutch collar, a plurality of arms secured to a rock shaft and having the plurality of pins extending therefrom, means for pivotally mounting said rock shaft, and limiting means for restricting the range of movement of the pins, said limiting means including a collar mounted coaxially with and spaced from said clutch collar, means mounting said collar to fix it axially with respect to said shaft, and said collar having a plurality of elongated slots therein in which said pins are positioned, said elongated slots providing freedom for movement of the pins within a predetermined range.

3. A shifting means for an overdrive clutch collar, which clutch collar is slidably mounted on a shaft and rotatable therewith, said clutch collar having a circumferential groove therein; said shifting means comprising a plurality of pins adapted to be positioned within the circumferential groove and adapted to be moved axially of said shaft, whereby the clutch collar is shifted, said plurality of pins being symmetrically disposed about the center of rotation of said clutch collar, a plurality of arms secured to a rock shaft and having the plurality of pins extending therefrom, limiting means including an axially fixed collar for restricting the range of movement of the pins, and a mounting bracket for said fixed collar having journal means therein for said rock shaft.

4. A shifting means for an overdrive clutch collar, which clutch collar is slidably mounted on a shaft and rotatable therewith, said clutch collar having a circumferential groove therein; said shifting means comprising a plurality of pins adapted to be positioned within the circumferential groove and adapted to be moved axially of said shaft, whereby the clutch collar is shifted, said plurality of pins being symmetrically disposed about the center of rotation of said clutch collar, a plurality of arms secured to a rock shaft and having the plurality of pins extending therefrom, bearing means rotatably mounted in said circumferential groove and adapted to receive therein the plurality of pins, limiting means including an axially fixed collar for restricting the range of movement of the pins, a mounting bracket for said fixed collar having journal means therein for said rock shaft, and linkage means connected to said rock shaft for rocking said rock shaft.

References Cited in the file of this patent

UNITED STATES PATENTS

| Number | Name | Date |
| --- | --- | --- |
| 959,878 | Page | May 31, 1910 |
| 1,316,590 | Neville | Sept. 23, 1919 |
| 1,926,940 | Gaylord | Sept. 12, 1933 |
| 1,935,234 | White | Nov. 14, 1933 |
| 1,967,539 | Roos | July 24, 1934 |
| 2,006,913 | Conley | July 2, 1935 |
| 2,241,002 | Peterson | May 6, 1941 |
| 2,438,672 | Margrave | Mar. 30, 1948 |
| 2,464,479 | Avila | Mar. 15, 1949 |
| 2,485,732 | Gustafson | Oct. 25, 1949 |
| 2,494,222 | Zwald | Jan. 10, 1950 |
| 2,541,885 | Neely | Feb. 13, 1951 |